US012278036B2

(12) United States Patent
Mousavi

(10) Patent No.: US 12,278,036 B2
(45) Date of Patent: Apr. 15, 2025

(54) MAGNETIC CORE FOR AN ELECTROMAGNETIC INDUCTION DEVICE, AN ELECTROMAGNETIC INDUCTION DEVICE COMPRISING THE SAME, AND A METHOD OF MANUFACTURING A MAGNETIC CORE

(71) Applicant: HITACHI ENERGY LTD, Zürich (CH)

(72) Inventor: Seyed Ali Mousavi, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 486 days.

(21) Appl. No.: 17/054,754

(22) PCT Filed: May 8, 2019

(86) PCT No.: PCT/EP2019/061824
§ 371 (c)(1),
(2) Date: Nov. 11, 2020

(87) PCT Pub. No.: WO2019/215233
PCT Pub. Date: Nov. 14, 2019

(65) Prior Publication Data
US 2021/0217551 A1 Jul. 15, 2021

(30) Foreign Application Priority Data
May 11, 2018 (EP) .................................... 18171956

(51) Int. Cl.
*H01F 27/245* (2006.01)
*H01F 3/02* (2006.01)
(Continued)

(52) U.S. Cl.
CPC ............. *H01F 27/245* (2013.01); *H01F 3/02* (2013.01); *H01F 3/04* (2013.01); *H01F 27/25* (2013.01)

(58) Field of Classification Search
CPC .......... H01F 27/245; H01F 27/25; H01F 3/02; H01F 3/04
(Continued)

(56) References Cited

U.S. PATENT DOCUMENTS 3,153,215 A * 10/1964 Burkhardt ............. H01F 27/245 336/5
3,156,886 A * 11/1964 Sutherland ............. H01F 30/10 336/215
(Continued)

FOREIGN PATENT DOCUMENTS

CA 2752327 A1 * 3/2012 ............. H01F 17/04
CH 310611 A * 10/1919
(Continued)

OTHER PUBLICATIONS

Chinese Office Action with English Translation for Chinese application No. 2019800250008, dated Mar. 2, 2021.
(Continued)

*Primary Examiner* — Shawki S Ismail
*Assistant Examiner* — Joselito S. Baisa
(74) *Attorney, Agent, or Firm* — Sage Patent Group

(57) ABSTRACT

A magnetic core for an electromagnetic induction device, comprising: a limb made of a grain-oriented material, a yoke made of an amorphous material, and an auxiliary joint member made of grain-oriented material, wherein the auxiliary joint member joints the limb with the yoke, wherein the grain orientation of the limb is perpendicular to the grain orientation of the auxiliary joint member.

15 Claims, 3 Drawing Sheets

(51) Int. Cl.
*H01F 3/04* (2006.01)
*H01F 27/25* (2006.01)

(58) Field of Classification Search
USPC .......................................................... 336/233
See application file for complete search history.

(56) References Cited

U.S. PATENT DOCUMENTS

| | | | | | |
|---|---|---|---|---|---|
| 3,157,850 | A | * | 11/1964 | Winter | H01F 27/245 336/215 |
| 3,290,633 | A | * | 12/1966 | Kuriyama | H01F 27/245 336/212 |
| 3,546,645 | A | * | 12/1970 | Frowein | H01F 27/245 336/60 |
| 3,686,561 | A | * | 8/1972 | Spreadbury | H01F 38/02 323/308 |
| 3,743,991 | A | * | 7/1973 | Gumpper | H01F 27/245 336/217 |
| 4,201,966 | A | * | 5/1980 | De Laurentis | H01F 27/245 336/217 |
| 4,283,842 | A | * | 8/1981 | DeLaurentis | H01F 27/245 29/609 |
| 4,445,104 | A | * | 4/1984 | Lin | H01F 27/245 29/609 |
| 4,506,248 | A | * | 3/1985 | Lin | H01F 27/245 336/212 |
| 4,668,931 | A | | 5/1987 | Boenitz | |
| 4,853,292 | A | * | 8/1989 | Bruckner | H01F 27/245 428/600 |
| 5,371,486 | A | * | 12/1994 | Yamada | H01F 27/33 336/212 |
| 5,959,523 | A | * | 9/1999 | Westberg | H01F 27/245 336/216 |
| 8,686,824 | B2 | * | 4/2014 | Levin | H01F 17/04 336/212 |
| 9,576,709 | B2 | * | 2/2017 | Sarver | H01F 3/02 |
| 2006/0226947 | A1 | * | 10/2006 | Pauley | H01F 27/245 336/234 |
| 2012/0068805 | A1 | | 3/2012 | Levin et al. | |
| 2016/0372248 | A1 | | 12/2016 | Pradhan et al. | |

FOREIGN PATENT DOCUMENTS

| | | | | | |
|---|---|---|---|---|---|
| CN | 101901673 | A | | 12/2010 | |
| CN | 106257605 | A | | 12/2016 | |
| EP | 2685477 | A1 | | 1/2014 | |
| FR | 1260446 | A | * | 5/1961 | |
| GB | 773666 | A | | 5/1957 | |
| GB | 1147869 | A | | 4/1969 | |
| JP | H08222454 | A | | 8/1996 | |
| JP | 2002359123 | A | * | 12/2002 | |
| JP | 3592778 | B2 | * | 11/2004 | |
| JP | 2009010253 | A | * | 1/2009 | |
| JP | 201348138 | A | | 3/2013 | |
| JP | 2013080856 | A | | 5/2013 | |
| JP | 201856336 | A | | 4/2018 | |
| WO | 2017159163 | A1 | | 9/2017 | |
| WO | WO-2018062274 | A1 | * | 4/2018 | H01F 27/24 |

OTHER PUBLICATIONS

International Search Report and Written Opinion for International Application No. PCT/EP2019/061824 dated Jul. 22, 2019, 13 pages.
Japanese Notice of Reasons for Refusal, Japanese Patent Application No. 2020-563686, Jan. 4, 2022, 3 pages.

* cited by examiner

MAGNETIC CORE FOR AN ELECTROMAGNETIC INDUCTION DEVICE, AN ELECTROMAGNETIC INDUCTION DEVICE COMPRISING THE SAME, AND A METHOD OF MANUFACTURING A MAGNETIC CORE

CROSS REFERENCE TO RELATED APPLICATIONS

This application is a 35 U.S.C. § 371 national stage application of PCT International Application No. PCT/EP2019/061824 filed on Nov. 14, 2019, which in turns claims foreign priority to European Patent Application No. 18171956.8, filed on May 11, 2018, the disclosures and content of which are incorporated by reference herein in their entirety.

TECHNICAL FIELD

The present disclosure generally relates to electromagnetic induction devices such as transformers and reactors, an in particular to magnetic cores of electromagnetic induction devices.

BACKGROUND

The magnetic core of an electromagnetic induction device such as a transformer provides an easy path for the linkage flux of windings and creates an efficient magnetic coupling for transferring energy.

In operation, no-load losses are created in the magnetic core. The no-load losses are caused by the magnetising current needed to energise the magnetic core and are not dependent of the load-current.

It is desirable to reduce the no-load losses as it can decrease the total ownership cost and it is also important from an environmental perspective.

Using amorphous material in the magnetic core can lower the no-load losses. Amorphous material has much lower losses at the same flux density compared to the normal grain-oriented steels that are used in magnetic cores. A drawback with amorphous materials is the lower saturation flux density.

JP2013080856 discloses a hybrid laminated core of a stationary induction electrical apparatus having limbs made of laminated silicon steel plates and a yoke that is made of laminated amorphous nature alloy thin bands. The connection between the limb and the yoke is by alternatingly arranging the silicon steel plates and the amorphous nature alloy thin band.

SUMMARY

One drawback with the configuration of the hybrid laminated core disclosed in JP2013080856 is that of additional losses in the joint region, which increase the magnetisation current and the no-load losses. These losses occur due to the bending of the flux in the joint regions with the flux crossing the grain orientation.

It has additionally been realised by the present inventor that jointing of amorphous and grain oriented material is one of the main challenges to realise hybrid magnetic cores. For example, the adjustment of the cutting machines for cutting the amorphous material and the grain-oriented material is difficult in practice. Moreover, amorphous material is soft compared to grain-oriented material and is more difficult to work with when jointing is being performed. This makes the interleaving of the laminated plates of amorphous material to make the joint difficult if using traditional magnetic core designs.

In view of the above, an object of the present disclosure is to provide a magnetic core which solves or at least mitigates existing problems of the state of the art.

There is hence according to a first aspect of the present disclosure provided a magnetic core for an electromagnetic induction device, comprising: a limb made of a grain-oriented material, a yoke made of an amorphous material, and an auxiliary joint member made of grain-oriented material, wherein the auxiliary joint member joints the limb with the yoke, wherein the grain orientation of the limb is perpendicular to the grain orientation of the auxiliary joint member.

By means of the auxiliary joint member the manufacturing of the magnetic core may be facilitated. Additionally, the perpendicular grain-orientation configuration reduces flux bending. No-load losses may thereby be reduced.

According to one embodiment the auxiliary joint member consists of a grain-oriented material.

According to one embodiment the grain orientation of the auxiliary joint member is parallel with the longitudinal extension of the yoke. The grain orientation of the auxiliary joint member is hence parallel with the central longitudinal axis of the yoke.

According to one embodiment the auxiliary joint member and the limb have a connection to each other which is inclined or angled relative to a central longitudinal axis of the limb.

The auxiliary joint member may have an increasing dimension from its connection with the yoke to its connection with the limb, in a direction from the limb towards the auxiliary joint member, along a central longitudinal axis of the limb.

The dimension may increase linearly.

The connection between the auxiliary joint member and the yoke may be parallel or essentially parallel with a central longitudinal axis of the limb.

According to one embodiment the limb and the auxiliary joint member each comprises a plurality of laminated plates, wherein the joint between the auxiliary joint member and the limb is formed by the laminated plates of the auxiliary joint member being interleaved with the laminated plates of the limb.

According to one embodiment the yoke and the auxiliary joint member each comprises a plurality of laminated plates, wherein the joint between the auxiliary joint member and the yoke is formed by the laminated plates of the auxiliary joint member being interleaved with the laminated plates of the yoke.

According to one embodiment the joint between the auxiliary joint member and the limb is a mitre joint. Using a mitre joint is especially advantageous in combination with the perpendicular configuration of the grain-orientation of the limb and the auxiliary joint member. At the joint, the flux abruptly changes direction of about 90°, and will thus not cross the grain-orientation structure of the limb and the yoke as it does in JP2013080856. The flux bending may thereby be improved. No-load losses may thereby be reduced.

According to one embodiment the angle of the mitre joint is 45°. This is a typical angle for cutting yokes and limbs when manufacturing traditional magnetic cores both being made of grain-oriented material. By using a mitre joint of 45° the same settings of the cutting machine may be used for the present hybrid design as for traditional designs made in the same factory.

According to one embodiment the joint between the auxiliary joint member and the yoke is a butt-lap joint. The yoke, which is made of amorphous material, can thereby be cut at right angle with respect to its longitudinal extension to joint with the auxiliary joint member. Due to the softness of the amorphous material this facilitates the interleaving of the laminated plates of the yoke with the laminated plates of the auxiliary joint member.

According to one embodiment the yoke has a larger cross-section than the limb. The saturation point of the yoke may thereby be increased.

There is according to a second aspect of the present disclosure provided an electromagnetic induction device comprising a magnetic core according to the first aspect.

According to one embodiment the electromagnetic induction device is a transformer or a reactor.

According to one embodiment the electromagnetic induction device is a high voltage electromagnetic induction device.

There is according to a third aspect of the present disclosure provided a method of manufacturing a magnetic core of an electromagnetic induction device, wherein the method comprises: b) jointing a limb made of grain-oriented material with an auxiliary joint member made of a grain-oriented material such that the grain-orientation of the limb is perpendicular to the grain-orientation of the auxiliary joint member, and c) jointing a yoke made of an amorphous material with the auxiliary joint member.

The jointing of the yoke and the auxiliary joint member may be made either after or before the jointing of the limb and the auxiliary joint member, i.e. the order of steps b) and c) may be interchanged.

According to one embodiment the limb, the yoke and the auxiliary joint member each comprises a plurality of laminated plates, wherein the jointing of the auxiliary joint member and the limb includes interleaving the laminated plates of the auxiliary joint member with the laminated plates of the limb, and wherein the jointing of the auxiliary joint member and the yoke includes interleaving the laminated plates of the auxiliary joint member with the laminated plates of the yoke.

One embodiment comprises performing an inclined cut of the auxiliary joint member with respect to its grain-orientation before the jointing, wherein the jointing of the limb and the auxiliary joint member forms a mitre joint.

One embodiment comprises performing a perpendicular cut of the auxiliary joint member with respect to its grain-orientation before the jointing, wherein the jointing of the auxiliary joint member and the yoke forms a butt-lap joint.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
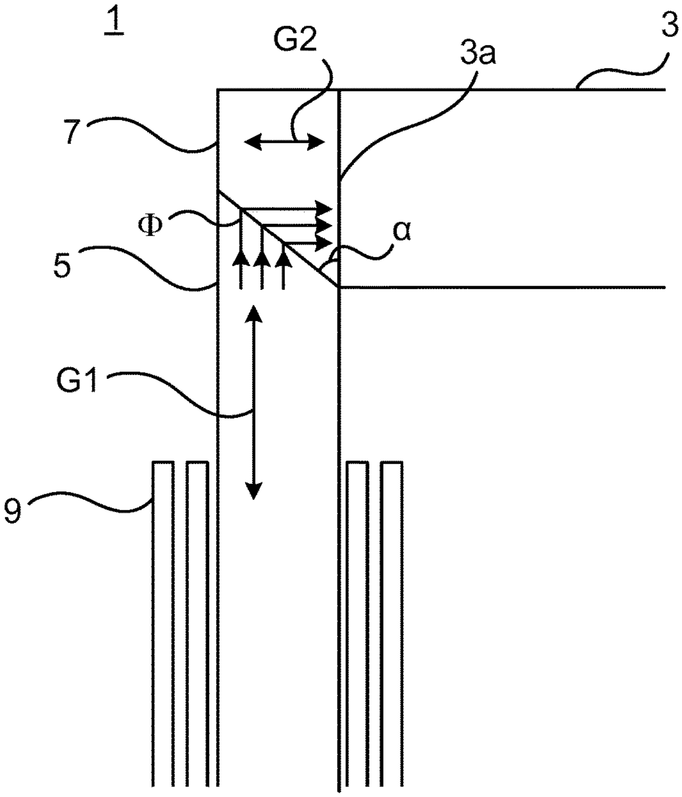
FIG. 1 schematically depicts a section of a corner portion of an example of a magnetic core.

FIG. 1 depicts an upper left corner of an example of a magnetic core 1 for an electromagnetic induction device such as a power transformer, a distribution transformer or a reactor.

The magnetic core 1 comprises an upper yoke 3, a limb 5, and an auxiliary joint member 7. Although not shown in the drawing, the magnetic core also comprises a lower yoke and another limb which are identical to the upper yoke 3 and the limb 5, at least concerning material type and jointing.

The yoke 3 is made of an amorphous material. In particular, the yoke 3 may consist of an amorphous material. The material may for example be amorphous steel. The yoke 3 comprises a plurality of laminated plates or ribbons. Each plate is preferably made of amorphous material.

The limb 5 is made of a grain-oriented material. In particular, the limb 5 may consist of a grain-oriented material. The grain-oriented material may for example be silicon steel. The grain-orientation of the limb 9 may have a first orientation as shown by arrows G1, preferably parallel with the longitudinal direction of the limb 9.

The limb 5 comprises a plurality of laminated plates. Each plate is preferably made of grain-oriented material.

The auxiliary joint member 7 is made of a grain-oriented material. In particular, the auxiliary joint member 7 may consist of a grain-oriented material. The grain-oriented material may for example be silicon steel. The grain-orientation of the auxiliary joint member 7 may have a second orientation as shown by arrows G2, preferably parallel with the longitudinal direction of the yoke 3 and perpendicular to the first orientation. The grain orientation of the auxiliary joint member 7 and the grain orientation of the limb 5 are hence preferably perpendicular.

The auxiliary joint member 7 comprises a plurality of laminated plates. Each plate is preferably made of grain-oriented material.

The auxiliary joint member 7 joints the yoke 3 with the limb 5. The auxiliary joint member 7 hence connects the yoke 3 with the limb 5. The auxiliary joint member 7 is arranged between the yoke 3 and the limb 5. The auxiliary joint member 7 may have a polyhedral shape and the yoke 3 may be joined with a first face of the auxiliary joint member 7, and the limb 5 may be joined with a second face of the auxiliary joint member 7 adjacent to the first face.

The auxiliary joint member 7 and the yoke 3 are jointed by interleaving of the laminated plates/ribbons of the yoke 3 with the laminated plates of the auxiliary joint member 7. The frictional forces thus obtained hold the auxiliary joint member 7 and the yoke 3 together.

The auxiliary joint member 7 and the limb 5 are jointed by interleaving of the laminated plated of the limb 5 and the laminated plates of the auxiliary joint member 7. The frictional forces thus obtained hold the auxiliary joint member 7 and the limb 5 together.

The yoke 3 may have a greater cross-sectional area than the limb 3, preferably at a cross-section taken anywhere along the longitudinal extension of the yoke 3. The cross-sectional area of the yoke 3 may be selected such that is compensates for the lower saturation point of the amorphous material compared to the grain-oriented material of the limb 5 so that the yoke 3 will not become saturated during normal operation.

The joint between the auxiliary joint member 7 and the limb 5 may be a mitre joint or a step-lap mitre joint. The angle α of the mitre joint or step-lap mitre joint may for example be about 45°, for example 45° plus/minus 1-2°, or it may be exactly 45°. The angle α is the angle between the first face and the second face of the auxiliary joint member 7.

Due to the angled structure of the joint between the auxiliary joint member 7 and the limb 5 and due to their perpendicular grain orientation, the magnetic flux Φ will essentially not cross the grain orientation of the limb 5 or the auxiliary joint member 7. Instead, there will an essentially perpendicular flow direction change at the joint, where the magnetic flux Φ continues to follow the grain orientation of the auxiliary joint member 7.

The joint between the auxiliary joint member 7 and the yoke 3 may be a butt-lap joint. The yoke 3 hence has a straight cut end face 3*a* which is perpendicular to the direction of longitudinal extension of the yoke 3.

In the example in FIG. 1, the yoke 3 has a greater cross-sectional area than the limb 5 and thus the auxiliary joint member 7 has a trapezoidal shape seen from the side.

As shown in FIG. 1, windings 9 may be provided around the limb 5 of the magnetic core 1.

Figure 2:
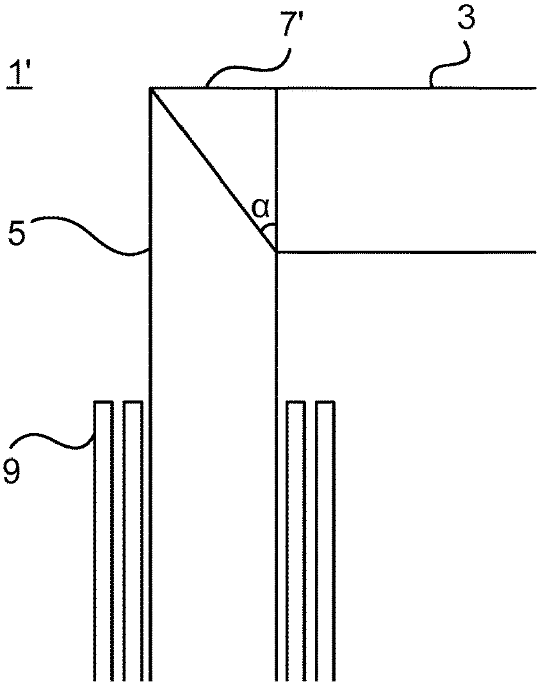
FIG. 2 schematically depicts a section of a corner portion of another example of a magnetic core.

FIG. 2 shows another example of a magnetic core. Magnetic core 1' is very similar to the magnetic core 1 in FIG. 1. The auxiliary joint member 7' is however cut with an angle that differs from the 45° or about 45° angle shown in FIG. 1. In the example in FIG. 2 the angle α of the mitre joint or step-lap mitre joint may for example be in the range of 20°<α<45° and 45°<α<70°.

Figure 3:
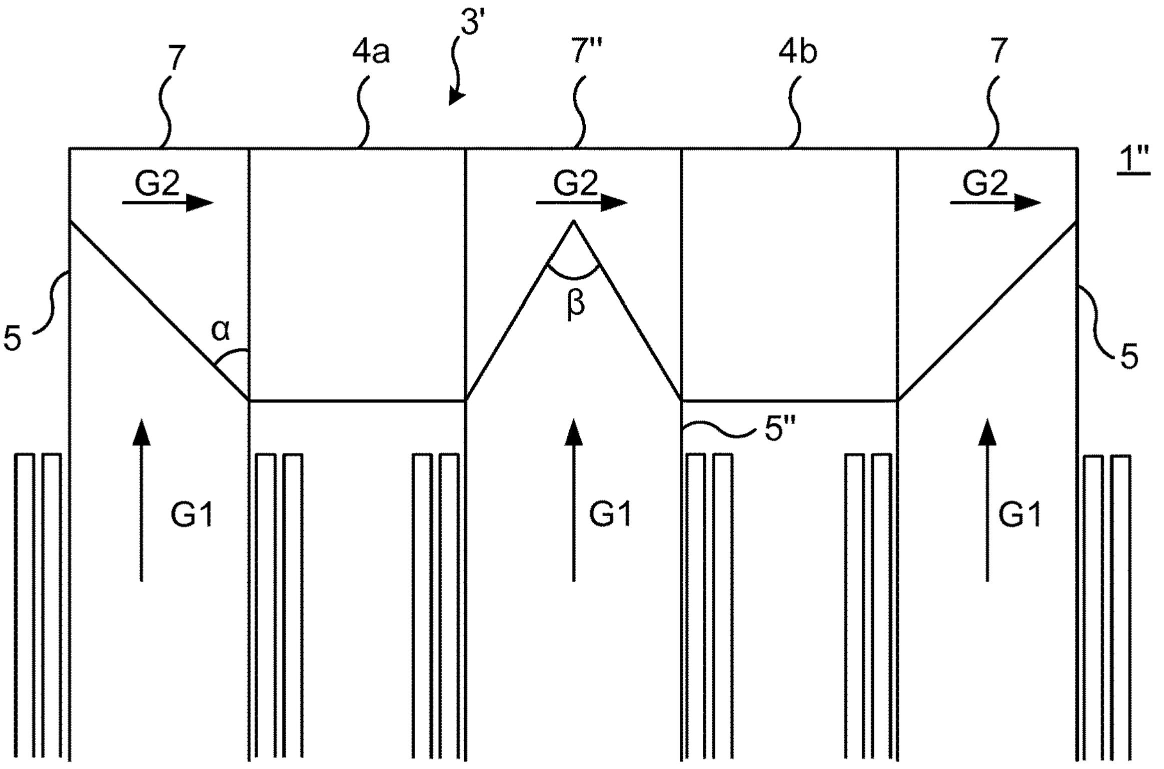
FIG. 3 schematically depicts an example of a magnetic core for a three-phase application.

FIG. 3 schematically shows an example of magnetic core 1" for a three-phase application. The magnetic core 1" is configured to be used in a three-phase electromagnetic induction device. The magnetic core 1" comprises two limbs 5 arranged laterally and a limb 5" arranged between the two lateral limbs 5. The three limbs 5, 5" are arranged parallel with each other. The cross-sectional dimension of all three limbs 5, 5" may be the same until they start to taper. All three limbs 5, 5" are made of a grain-oriented material with their grain orientation being parallel with their longitudinal extension. The limbs 5, 5" may be made of laminated plates.

Additionally, the yoke 3" comprises a first yoke member 4*a* and a second yoke member 4*b*. Each of the first yoke member 4*a* and the second yoke member 4*b* is made of amorphous material. The first yoke member 4*a* is connected to the left hand side limb 5 as described above, via an auxiliary joint member 7 or 7'. The second yoke member 4*b* is connected to the right hand side limb 5 as described above, via an auxiliary joint member 7 or 7'.

The magnetic core 1" furthermore includes an additional auxiliary joint member 7". The auxiliary joint member 7" is configured to provide a connection between the limb 5", in the following referred to as "central limb" and the first yoke member 4*a* and the second yoke member 4*b*.

The central limb 5" has tapering end portions. The upper such tapering end portion can be seen in FIG. 3. According to the example in FIG. 3, the tapering shape is symmetrical with respect to the central longitudinal axis of the limb 5". The tapering end portion is triangular or pyramid-shaped and forms the shape of an isosceles triangle. The top angle β, of the triangle may be equal to the twice the angle α of the mitre joint or step-lap mitre joint of the limbs 5/auxiliary joint members 7.

The auxiliary joint member 7", in the following referred to as "central auxiliary joint member" is configured to receive the tapering end portion of the central limb 5". To this end, the central auxiliary joint member 7" has a cut-out which corresponds to the shape of the triangular tapering end portion.

The central auxiliary joint member 7" is made of grain-oriented material. The grain orientation is perpendicular to the grain orientation of the central limb 5".

The central auxiliary joint member 7" may be a single piece formed by laminated grain oriented plates extending between the first yoke member 5*a* and the second yoke member 4*b*, or two or more pieces formed of laminated grain oriented laminated plates, whereby for example two pieces may be jointed along a vertical line intersecting the apex of the top angle β. The jointing may be made by interleaving of the laminated plates of the two or more pieces.

The laminated plates of the central auxiliary joint member 7" may be interleaved with the laminated plates of the first yoke portion 4*a* and with the laminated plates of the second yoke portion 4*b*. The central auxiliary joint member 7" may thereby be jointed with the first yoke portion 4*a* and the second yoke portion 4*b*. Similarly, the laminated plates of the central auxiliary joint member 7" may be interleaved with the laminated plates of the central limb 5".

In the example in FIG. 3, the angle α may for example be 45° or it may differ from 45°. the angle α may for example be in the range of 20°<α<45° and 45°<α<70°.

Figure 4:
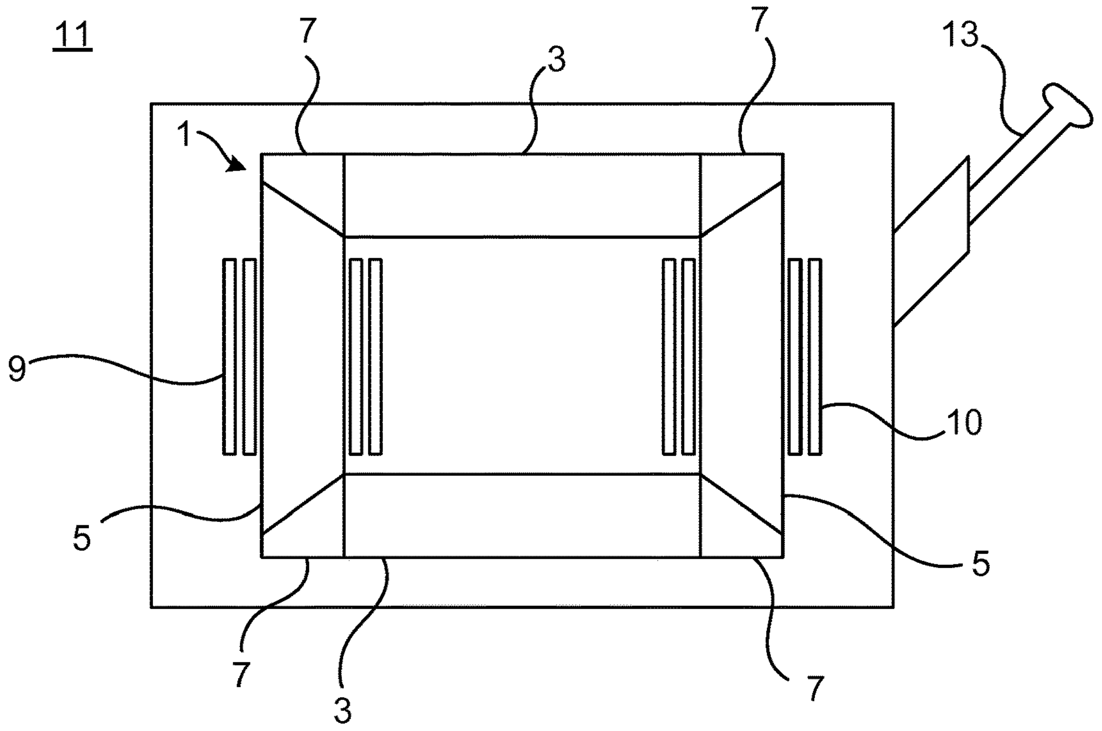
FIG. 4 schematically shows a section of a side view of an electromagnetic induction device with the magnetic core having been made visible.

FIG. 4 schematically shows an example of an electromagnetic induction device 11. The electromagnetic induction device 11 may for example be a transformer such as a power transformer or a distribution transformer, or a reactor.

The electromagnetic induction device 11 may for example a high voltage electromagnetic induction device such a high voltage direct current (HVDC) electromagnetic induction device, or a medium voltage electromagnetic induction device.

The electromagnetic induction device 11 comprises the magnetic core 1, windings 9 and 10 wound around limbs 5, and bushing 13 of which only one is shown, electrically connected to respective windings 9, 10.

The example in FIG. 4 shows a two-phase electromagnetic induction device 11, but the magnetic core 1 could alternatively be provided with further limbs for additional electrical phases, e.g. for three-phase applications.

Figure 5:
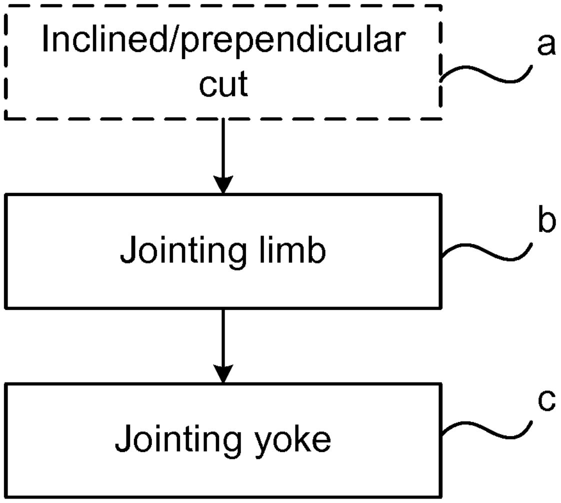
FIG. 5 is a flowchart of a method of manufacturing a magnetic core.

FIG. 5 shows a flowchart of a method of manufacturing the magnetic core 1, 1'.

In a step a) the auxiliary joint member 7, 7' is cut with an inclined cut relative to its grain orientation to obtain the second face which is to be jointed with the limb 5. The auxiliary joint member 7, 7' is also cut with a perpendicular cut relative to its grain orientation to obtain the first face which is to be assembled with the yoke 3. The angle α is formed between the first face and the second face. The two cuts may be performed in any order.

In a step b) the auxiliary joint member 7, 7' is jointed with the limb 5. In particular, laminated plates of the auxiliary joint member 7, 7' are interleaved with laminated plates of the limb 5. In this manner, the mitre joint or step-lap mitre joint is formed.

In step c) the auxiliary joint member 7, 7' is jointed with the yoke 3. In particular, laminated plates of the auxiliary joint member 7, 7' are interleaved with laminated plates of the yoke 3. In this manner, the butt-lap joint is formed. It is to be noted that steps b) and c) may be performed in any order.

The above steps a)-c) are performed for all the auxiliary joint members 7, 7' included in the magnetic core 1, 1'.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A magnetic core for an electromagnetic induction device, comprising:

a limb made of a first grain-oriented material, wherein the limb is a vertically aligned member of the magnetic core, a yoke made of an amorphous material, wherein the yoke is a horizontally aligned member of the magnetic core, and an auxiliary joint member made of a second grain-oriented material, wherein the auxiliary joint member joints the limb and the yoke with the auxiliary joint member being between the limb and yoke such that the limb is not jointed directly to the yoke, wherein a grain orientation of the limb is perpendicular to a grain orientation of the auxiliary joint member, wherein a connection between the auxiliary joint member and the yoke is parallel with a central longitudinal axis of the limb, and wherein the auxiliary joint member and the yoke are jointed by interleaving laminated plates of the yoke with laminated plates of the auxiliary joint member such that frictional forces hold the auxiliary joint member and the yoke together.

2. The magnetic core as claimed in claim 1, wherein the auxiliary joint member consists of the second grain-oriented material.

3. The magnetic core as claimed in claim 1, wherein the limb and the auxiliary joint member each comprises a plurality of laminated plates, wherein a joint between the auxiliary joint member and the limb is formed by the laminated plates of the auxiliary joint member being interleaved with the laminated plates of the limb.

4. The magnetic core as claimed in claim 1, wherein the yoke and the auxiliary joint member each comprises a plurality of laminated plates, wherein a joint between the auxiliary joint member and the yoke is formed by the laminated plates of the auxiliary joint member being interleaved with the laminated plates of the yoke.

5. The magnetic core as claimed in claim 1, wherein a joint between the auxiliary joint member and the limb is a mitre joint.

6. The magnetic core as claimed in claim 5, wherein an angle of the mitre joint is 45°.

7. The magnetic core as claimed in claim 1, wherein a joint between the auxiliary joint member and the yoke is a butt-lap joint.

8. The magnetic core as claimed in claim 1, wherein the yoke has a larger cross-section than the limb.

9. An electromagnetic induction device comprising a magnetic core as claimed in claim 1.

10. The electromagnetic induction device as claimed in claim 9, wherein the electromagnetic induction device is a transformer or a reactor.

11. The electromagnetic induction device as claimed in claim 9, wherein the electromagnetic induction device is a high voltage electromagnetic induction device.

12. A method of manufacturing a magnetic core of an electromagnetic induction device, wherein the method comprises:

jointing a limb made of grain-oriented material with an auxiliary joint member made of a grain-oriented material such that a grain-orientation of the limb is perpendicular to a grain-orientation of the auxiliary joint member, wherein the limb is a vertically aligned member of the magnetic core, and jointing a yoke made of an amorphous material with the auxiliary joint member, wherein the auxiliary joint member is between the limb and yoke such that the limb is not jointed directly to the yoke, wherein the yoke is a horizontally aligned member of the magnetic core, wherein a connection between the auxiliary joint member and the yoke is parallel with a central longitudinal axis of the limb, and wherein the auxiliary joint member and the yoke are jointed by interleaving laminated plates of the yoke with laminated plates of the auxiliary joint member such that frictional forces hold the auxiliary joint member and the yoke together.

13. The method as claimed in claim 12, wherein the limb, the yoke and the auxiliary joint member each comprises a plurality of laminated plates, wherein the jointing of the auxiliary joint member and the limb includes interleaving the laminated plates of the auxiliary joint member with the laminated plates of the limb, and wherein the jointing of the auxiliary joint member and the yoke includes interleaving the laminated plates of the auxiliary joint member with the laminated plates of the yoke.

14. The method as claimed in claim 12, comprising performing an inclined cut of the auxiliary joint member with respect to its grain-orientation before the jointing, wherein the jointing of the limb and the auxiliary joint member forms a mitre joint.

15. The method as claimed in claim 12, comprising performing a perpendicular cut of the auxiliary joint member with respect to its grain-orientation before the jointing, wherein the jointing of the auxiliary joint member and the yoke forms a butt-lap joint.

* * * * *